United States Patent [19]
Sun et al.

[11] Patent Number: 5,941,333
[45] Date of Patent: Aug. 24, 1999

[54] BICYCLE WITH A PLANETARY-GEAR-TRAIN TYPE TRANSMISSION AND AN AUXILLIARY ELECTRICAL TRANSMISSION

[75] Inventors: Chien-Ping Sun; Ing-Ren Chen, both of Taichung Hsien, Taiwan

[73] Assignee: Giant Manufacturing Co., Ltd., Taichung Hsien, Taiwan

[21] Appl. No.: 09/004,173

[22] Filed: Jan. 7, 1998

[51] Int. Cl.$^6$ .................................................. B62K 11/00
[52] U.S. Cl. .......................... 180/206; 180/220; 180/260
[58] Field of Search ..................... 180/205, 206, 180/220, 260

[56] References Cited

U.S. PATENT DOCUMENTS

| | | | |
|---|---|---|---|
| 713,467 | 11/1902 | MacDonald | 180/206 |
| 2,553,465 | 5/1951 | Monge | 180/206 |
| 3,773,131 | 11/1973 | Jaulmes | 180/206 |
| 4,706,982 | 11/1987 | Harttmann | 280/238 |
| 5,370,200 | 12/1994 | Takata | 180/206 |
| 5,375,676 | 12/1994 | Takata et al. | 180/206 |
| 5,570,752 | 11/1996 | Takata | 180/206 |
| 5,758,736 | 6/1998 | Yamauchi | 180/220 |
| 5,829,546 | 11/1998 | Tseng | 180/206 |

FOREIGN PATENT DOCUMENTS

| | | |
|---|---|---|
| 0 636 538 | 2/1995 | European Pat. Off. . |
| 0 683 093 | 11/1995 | European Pat. Off. . |
| 0 700 826 | 3/1996 | European Pat. Off. . |
| 0 798 203 B 19979 | 10/1997 | European Pat. Off. . |
| 11/63 | 8/1956 | Germany . |
| 541 768 | 4/1956 | Italy . |
| 156 082 | 9/1956 | Sweden . |

OTHER PUBLICATIONS

Automotive Encyclopedia, Goodheart–Wilcox, figure 43–21, p. 560.

*Primary Examiner*—Lanna Mai
*Assistant Examiner*—Andrew J. Fischer
*Attorney, Agent, or Firm*—Harness, Dickey & Pierce, P.L.C.

[57] ABSTRACT

A bicycle includes a pedal-activated spindle, a sprocket-mounting sleeve and a front sprocket sleeved fixedly on the sleeve. A planetary gear train interconnects the spindle and the sleeve, thereby rotating the sleeve at a speed larger than that of the spindle. When a pedaling torque applied to the bicycle is above a predetermined torque, a ring gear of the train rotates in a casing. The ring gear is limited to rotate between a non-pushing position and a greatest-displacement position, and is biased by a spring to the non-pushing position. When the ring gear rotates from the non-pushing position by a predetermined angle, a sensing unit activates a motor unit so as to drive an auxiliary electrical transmission, thereby transferring a torque from the auxiliary electrical transmission to the sleeve. A first one-way clutch interconnects the train and the sleeve so that the output of the train can be transferred to the sleeve while preventing the rotation of the sleeve from being transferred to the train. A second one-way clutch interconnects the electrical transmission and the sleeve so that the output of the train can be transferred to the sleeve while preventing the rotation of the sleeve from being transferred to the electrical transmission.

2 Claims, 6 Drawing Sheets

5,941,333

BICYCLE WITH A PLANETARY-GEAR-TRAIN TYPE TRANSMISSION AND AN AUXILLIARY ELECTRICAL TRANSMISSION

BACKGROUND OF THE INVENTION

1. Field of the Invention

This invention relates to a bicycle, more particularly to a bicycle which is provided with a planetary-gear-train type transmission and an auxiliary electrical transmission that is driven automatically when a pedaling torque applied to the bicycle reaches a certain value, whereby the bicycle can be driven at a high speed in an energy-efficient manner.

2. Description of the Related Art

It is energy-consuming to run a bicycle at a high speed and to have a bicycle climb up a steep slope. A manually activatable electrical transmission is provided on a bicycle to solve this problem. However, the transmission is too bulky, and the load of a motor unit of the electrical transmission is too much, thereby shortening the serve life of the motor unit.

SUMMARY OF THE INVENTION

The object of this invention is to provide a bicycle with a planetary gear train and a compact auxiliary electrical transmission which can be driven automatically when a pedaling torque applied to the bicycle is above a certain value, whereby the bicycle can be driven at a high speed in an energy-efficient manner.

According to this invention, a bicycle includes a pedal-activated spindle, a sprocket-mounting sleeve and a front sprocket sleeved fixedly on the sleeve. A planetary gear train interconnects the spindle and the sleeve, thereby rotating the sleeve at a speed larger than that of the spindle. When a pedaling torque applied to the bicycle is above a predetermined torque, a ring gear of the train rotates in a casing. The ring gear is limited to rotate between a non-pushing position and a greatest-displacement position, and is biased by a spring to the non-pushing position. When the ring gear rotates from the non-pushing position by a predetermined angle, a sensing unit activates a motor unit so as to drive an auxiliary electrical transmission, thereby transferring a torque from the auxiliary electrical transmission to the sleeve. A first one-way clutch interconnects the train and the sleeve so that the output of the train can be transferred to the sleeve while preventing the rotation of the sleeve from being transferred to the train. A second one-way clutch interconnects the electrical transmission and the sleeve so that the output of the train can be transferred to the sleeve while preventing the rotation of the sleeve from being transferred to the electrical transmission.

BRIEF DESCRIPTION OF THE ACCOMPANYING DRAWINGS

Other features and advantages of this invention will become apparent in the following detailed description of the preferred embodiment of this invention with reference to the accompanying drawings in which.

DETAILED DESCRIPTION OF THE PREFERRED EMBODIMENT

Figure 1:
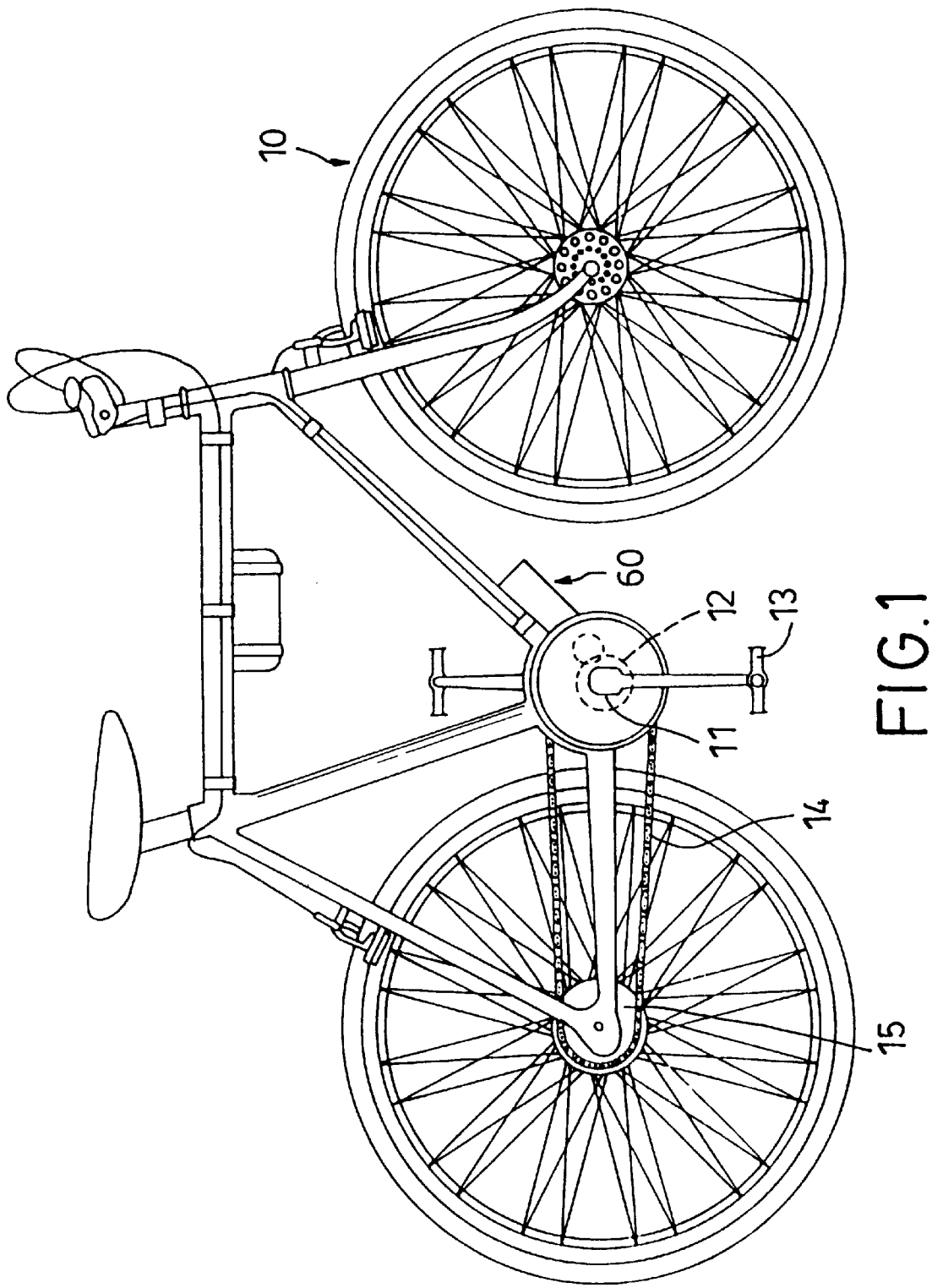
FIG. 1 is a side view of the preferred embodiment of a bicycle according to this invention.

Referring to FIG. 1, the preferred embodiment of a bicycle 10 according to this invention is shown to include a five-way tube 11, a casing 12 fixed to the tube 11, a pair of pedals 13, an endless chain 14, a rear sprocket 15 and a motor unit 60.

Figure 2:
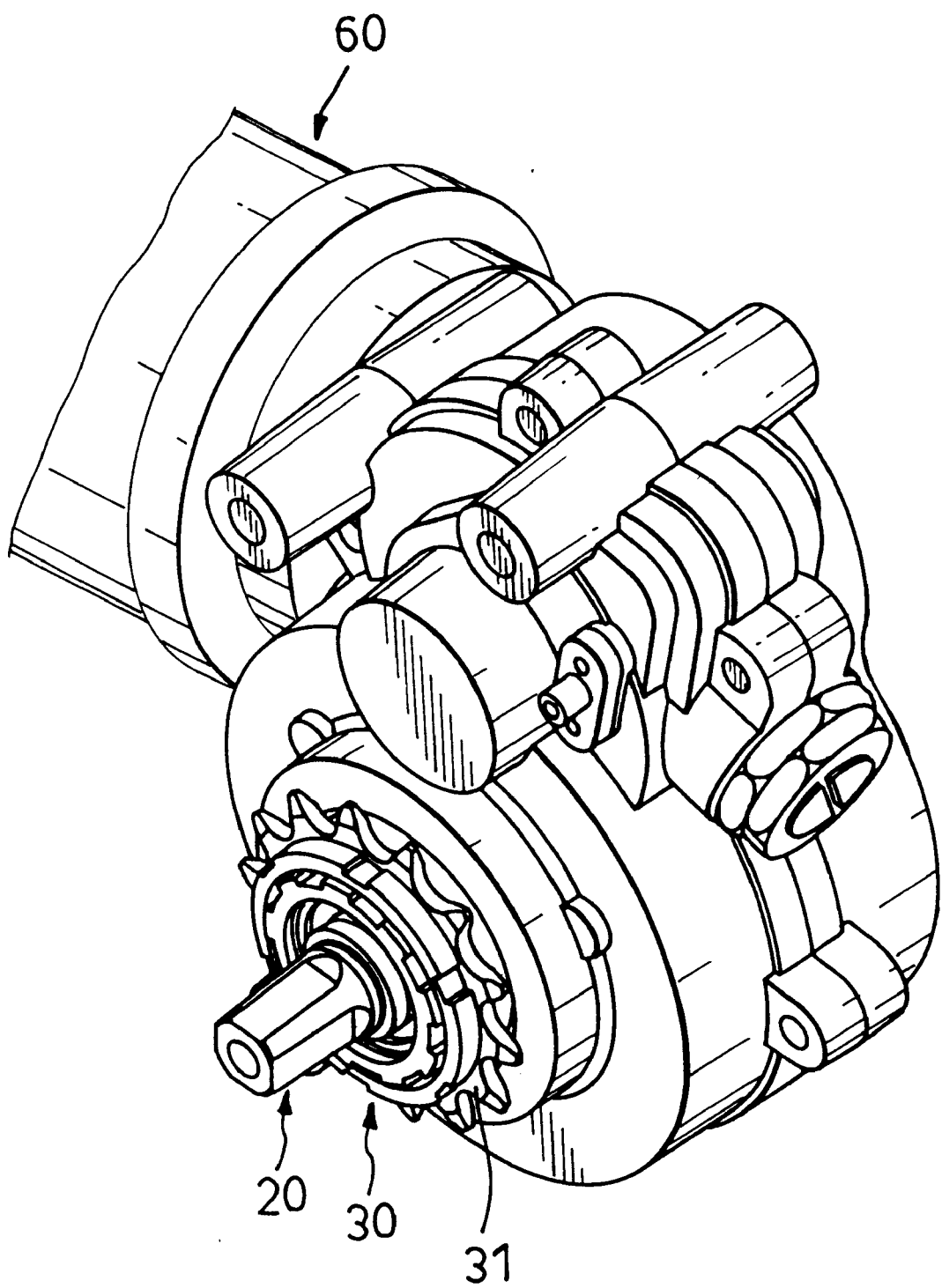
FIG. 2 is a perspective view of a transmission assembly of the preferred embodiment.

Referring to FIG. 2, a pedal-activated spindle 20 is journalled in the casing 12. A sprocket-mounting sleeve 30 is sleeved rotatably on the spindle 20. A front sprocket 31 is sleeved fixedly on the sleeve 30. The motor unit 60 is mounted on a front end portion of the casing 12.

Figure 3:
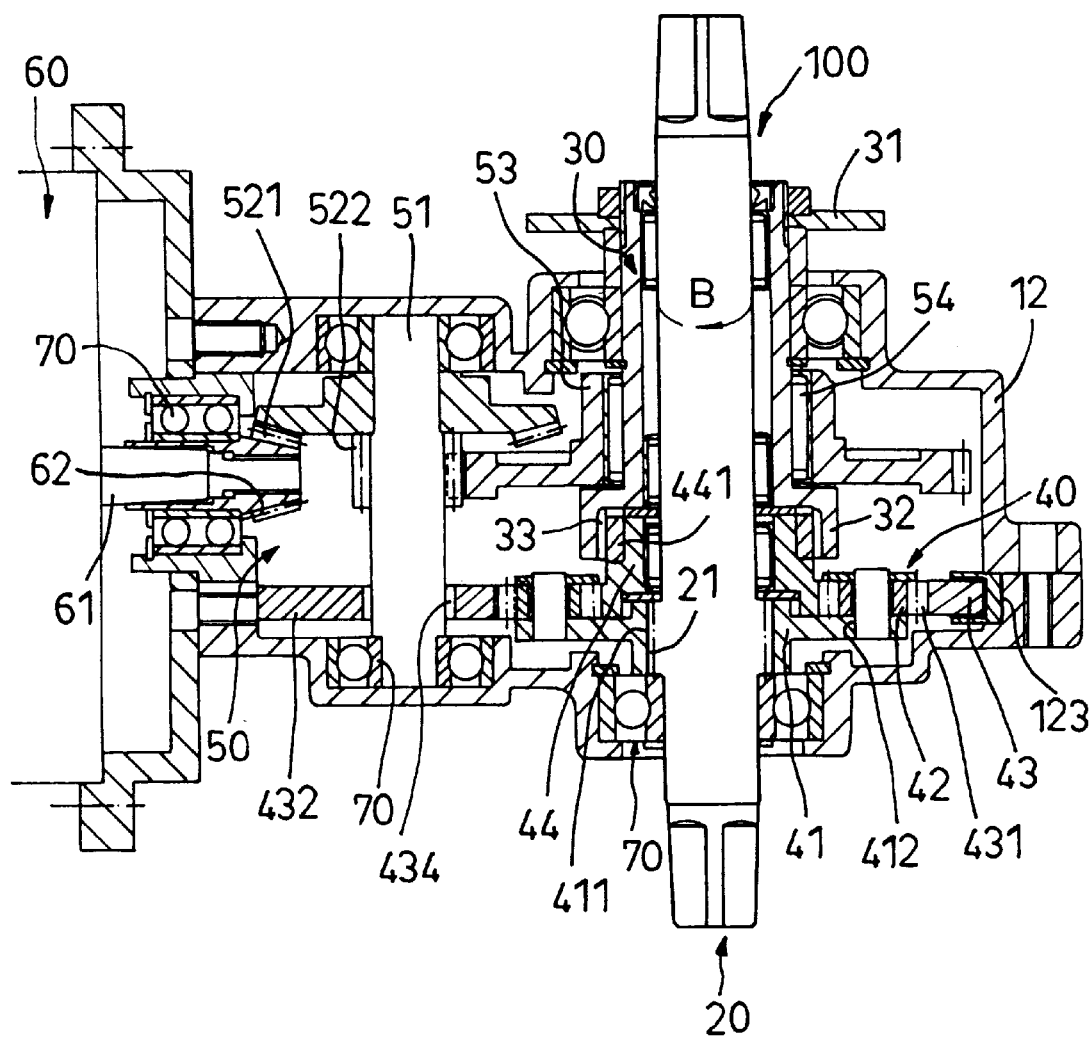
FIG. 3 is a sectional view of the transmission assembly of the preferred embodiment.
Figure 4:
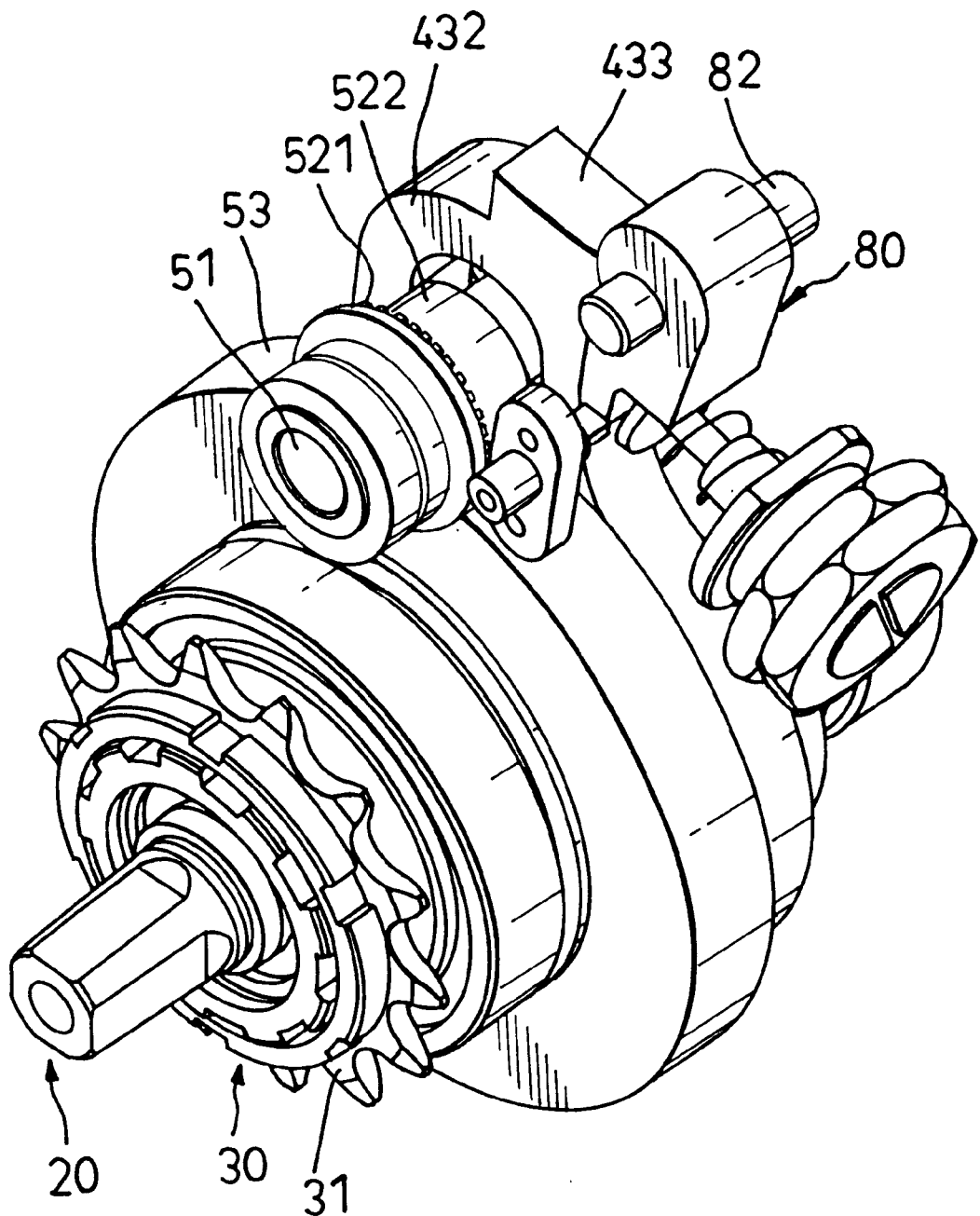
FIG. 4 is a perspective view showing a portion of the transmission assembly of the preferred embodiment.

FIG. 3 shows a transmission assembly 100 of the bicycle 10 which includes the spindle 20, the sleeve 30, a planetary gear train 40, an automatic auxiliary electrical transmission 50, the motor unit 60 and a plurality of bearings 70.

As illustrated, the spindle 20 extends through a rear portion of the casing 12 and is journalled therein by a pair of bearings 70.

The sprocket-mounting sleeve 30 has an outer end portion for mounting the front sprocket 31, and an enlarged inner end portion 32 which is integrally formed with an internal gear 33.

As shown in FIGS. 3, 4, 5 and 6, the planetary gear train 40 includes a planet carrier 41, three planet gears 42 (see FIG. 5), a ring gear 43 and a sun gear 44. The carrier 41 is integrally formed with an internally splined portion 411 which engages an externally splined portion 21 of the spindle 20 so as to rotate the carrier 41 synchronously with the spindle 20. Three pivot holes 412 are formed in the outer peripheral portion of the carrier 41 so as to mount the planet gears 42 pivotally therein. The ring gear 43 has a ring body 430 formed with an internally toothed portion 431 that meshes with the planet gears 42, a projection 432 that projects integrally and outwardly from a peripheral portion of the ring body 430, a pushing element 433 that is formed integrally with the outer edge of the projection 432, and a generally circular hole 434 that is formed through the projection 432. The periphery of the ring body 430 is confined within three U-shaped members 123 (only one is shown in FIG. 3) which are fixed in the casing 12, thereby preventing axial movement of the ring gear 43 along the spindle 20. The pushing element 433 abuts against a positioning element 124 which projects integrally and inwardly from an inner surface of the casing 12, thereby preventing the ring gear 43 from rotating in a counterclockwise direction indicated by the arrowhead (A) in FIG. 5. The sun gear 44 meshes with the planet gears 42 and is integrally formed with a ratchet portion 441 which engages the internal gear 33 of the sleeve 30 and which acts as a first one-way clutch that transfers the rotation of the sun gear 44 to the sleeve 30 while preventing the rotation of the sleeve 30 from being transferred to the sun gear 44.

Normally, the ring gear 43 cannot rotate in the casing 12. When a small pedaling torque is applied to the bicycle, the spindle 20 rotates in a counterclockwise direction indicated by the arrowhead (B) in FIG. 3 so as to rotate the carrier 41 by virtue of the engagement between the externally splined portion 21 and the internally splined portion 411, thereby rotating the planet gears 42 about the sun gear 44 in a counterclockwise direction. At this time, each of the planet gears 42 rotates about the center thereof in a clockwise direction due to the fact that the ring gear 43 is almost fixed in the casing 12. Because the ratchet portion 441 of the sun gear 44 engages the internal gear 33 of the sleeve 30, the sun gear 44 and the sleeve 30 rotate in a counterclockwise direction. In this way, the rotational speed of the sleeve 30 and the front sprocket 31 is much larger than that of the spindle 20.

When the pedaling torque applied to the bicycle is above a predetermined torque in order to speed up the bicycle or to have the bicycle climb up a steep slope, the ring gear 43 rotates clockwise by a small angle in response to the counterclockwise rotation of the spindle 20.

The motor unit 60 has a motor shaft 61 which is provided with a fixed first bevel gear 62 and which is journalled in the casing 12 by a pair of bearings 70.

The auxiliary transmission 50 has a reduction gearing which includes a driving shaft 51 journalled in the casing 12 by a pair of bearings 70 and extending through the generally circular hole 434 in the ring gear 43 in a direction parallel to the spindle 20 in such a manner that a clearance is left between the driving shaft 51 and the wall of the ring gear 43 which defines the generally circular hole 434, a second bevel gear 521 provided fixedly on the driving shaft 51, a small spur gear 522 provided fixedly on the driving shaft 51, and a large spur gear 53 which is sleeved rotatably on the sleeve 30 and which meshes with the small spur gear 522. A one-way bearing 54 interconnects the large spur gear 53 and the sleeve 30 and acts as a second one-way clutch that transfers the rotation of the large spur gear 53 to the sleeve 30 while preventing the rotation of the sleeve 30 from being transferred to the large spur gear 53. The large spur gear 53 has a tooth number which is much larger than that of the small spur gear 522. When the motor unit 60 starts to rotate the motor shaft 61, the driving shaft 51 rotates clockwise by virtue of the engagement between the first bevel gear 62 and the second bevel gear 521 so as to rotate the large spur gear 53 in a counterclockwise direction by virtue of the engagement between the small spur gear 522 and the large spur gear 53, thereby transferring counterclockwise direction of the large spur gear 53 to the sleeve 30 via the second one-way clutch 54.

Figure 5:
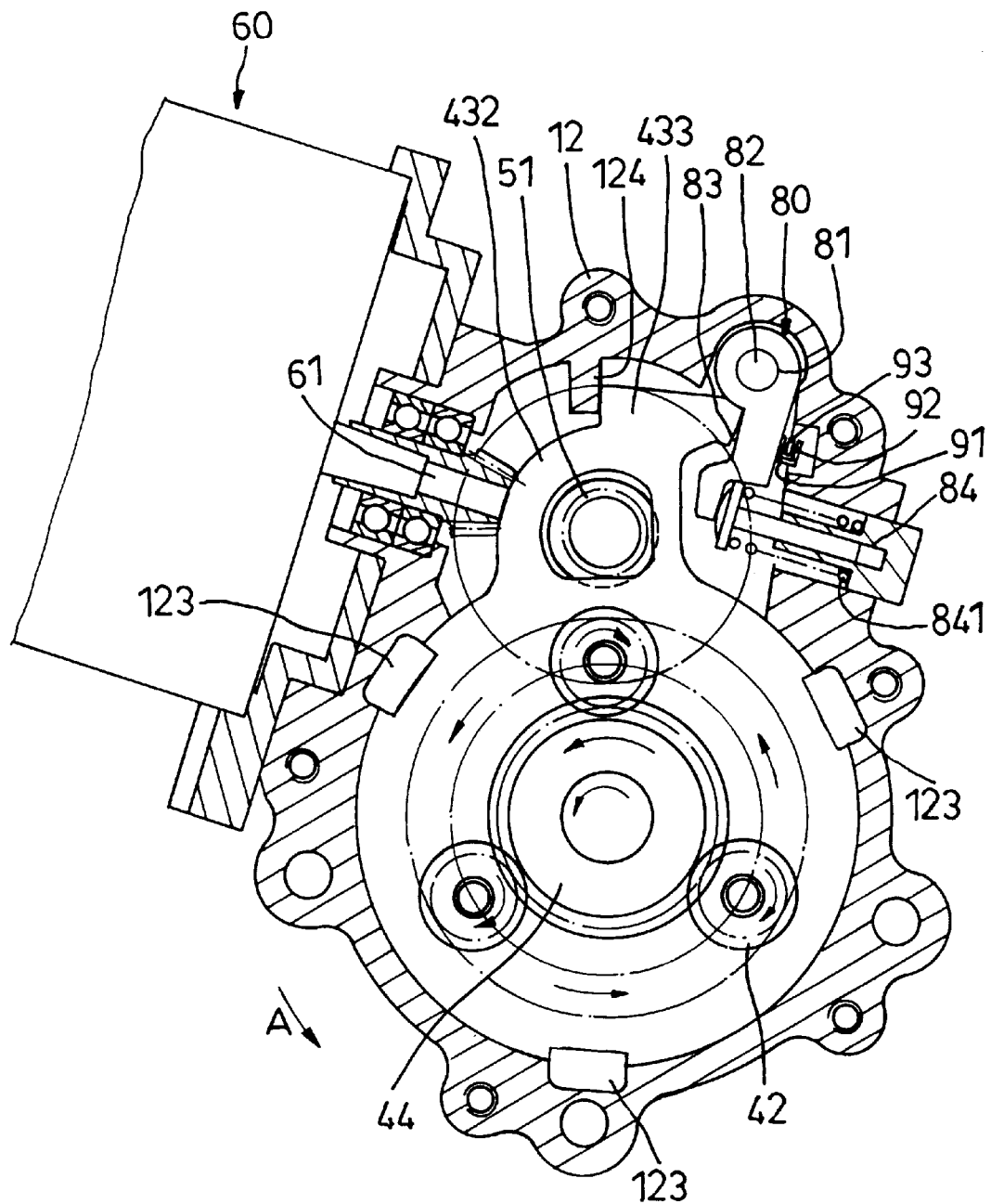
FIG. 5 is a sectional view illustrating the relationship between a ring gear and a sensing unit of the preferred embodiment.
Figure 6:
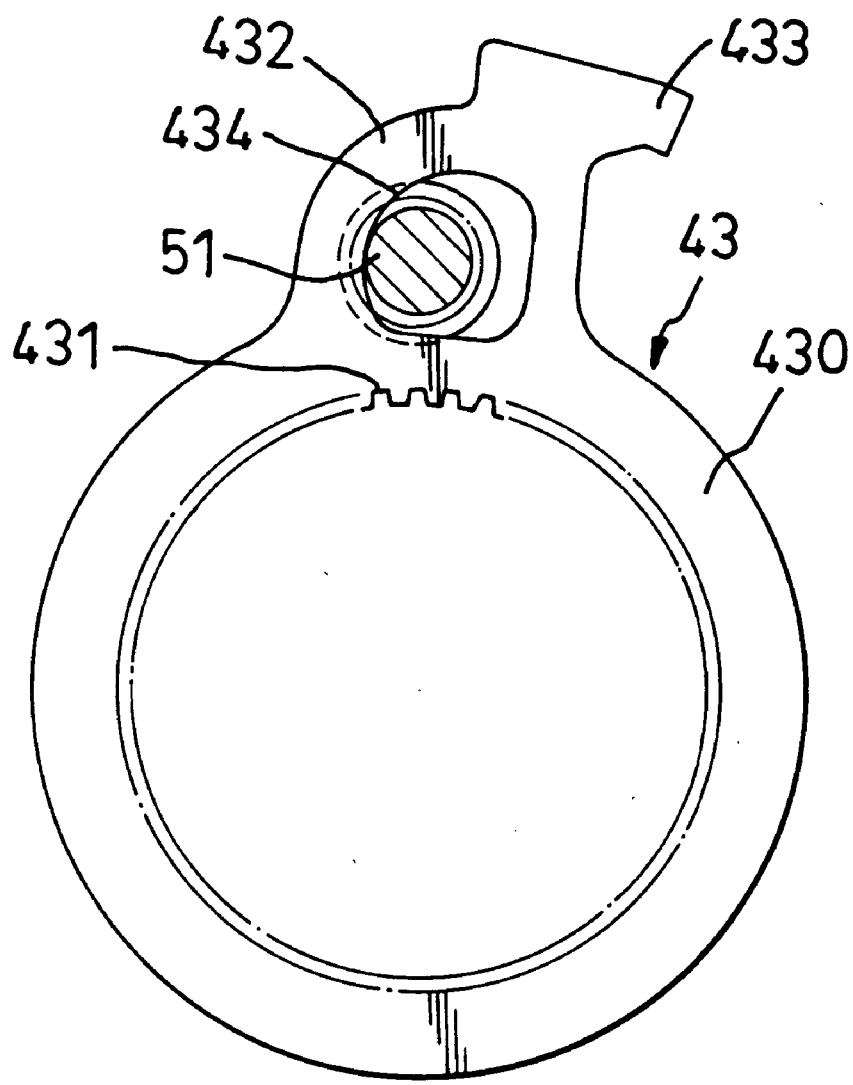
FIG. 6 is a schematic view illustrating the greatest-displacement position of the ring gear relative to a driving shaft in the preferred embodiment.

As best shown in FIG. 5, a sensing unit includes a swing arm 80 having a pivot hole 81 through which a pivot pin 82 extends, and a notch 83 in which a portion of the pushing element 433 of the ring gear 43 is confined, and a pushing rod 84 which is biased by a coiled compression spring 841 to press against the free end of the swing arm 80, thereby pressing the swing arm 80 against the pushing element 433 of the ring gear 43 to contact the pushing element 433 with the positioning element 124. The pushing element 433 of the ring gear 43 is therefore confined between the positioning element 124 and the swing arm 80. Accordingly, the ring gear 43 can only rotate between a non-positioning position shown in FIG. 5, in which the pushing element 433 contacts the positioning element 124, and a greatest-displacement position shown in FIG. 6, in which the left side of the driving shaft 51 contacts the wall of the ring gear 43 defining the generally circular hole 434, thereby preventing the clockwise rotation of the pushing element 433 in the casing 12. The positioning element 124 and the driving shaft 51 constitute a rotational-angle limiting unit.

The sensing unit further includes a U-shaped fixing element 91, a magnet unit consisting of two spaced-apart magnets 92, and an integrated circuit unit 93. The fixing element 91 is welded or adhered to the swing arm 80. The magnets 92 are fixed to the fixing element 91. The integrated circuit unit 93 is fixed in the casing 12 between the magnets 92 and is connected electrically to the motor unit 60. Consequently, the magnets 92 can be carried by the swing arm 80 to move relative to the integrated circuit unit 93, thereby producing a potential in the integrated circuit unit 93 based on the Hall effect. The potential produced in the circuit unit 93 has a magnitude which corresponds to the displacement of the magnets 92 relative to the circuit unit 93. When the ring gear 43 rotates clockwise from the non-pushing position shown in FIG. 5 by a predetermined angle, a corresponding potential is produced in the integrated circuit unit 93 so that the integrated circuit unit 93 sends a potential detecting signal to the motor unit 60. At this time, the motor unit 60 activates the automatic auxiliary electrical transmission 50.

Because the electrical transmission 50 can be activated automatically by the sensing unit when the pedaling torque applied to the bicycle is above a certain value, the bicycle can be driven at a high speed in an energy-efficient manner. Furthermore, since torque is transferred to the front sprocket 31 from both the planetary gear train 40 and the electrical transmission 50 at the same time, the load of the motor unit 60 is reduced, thereby enhancing the durability of the motor unit 60.

With this invention thus explained, it is apparent that numerous modifications and variations can be made without departing from the spirit and scope of this invention. It is therefore intended that this invention is limited only as indicated in the appended claims.

I claim:

1. A bicycle comprising:
    a pedal-activated spindle;
    a casing in which said spindle is journalled;
    a sprocket-mounting sleeve which is sleeved rotatably on said spindle;
    a front sprocket sleeved fixedly on said sprocket-mounting sleeve;
    a planetary gear train including:
        a planet carrier coupled with said spindle so as to rotate synchronously therewith,
        a plurality of planet gears mounted pivotally on said carrier,
        a ring gear mounted rotatably in said casing and provided with a fixed pushing element at a peripheral portion of said ring gear, said planet gears meshing with said ring gear, said ring gear having a ring body, a pushing element secured to a peripheral portion of said ring body, and a generally circular hole which is formed through said ring gear and which is located between said ring body and said pushing element,
        a sun gear sleeved rotatably on said spindle and meshing said planet gears so as to rotate said ring gear in said casing only when a pedaling torque applied to said bicycle is above a predetermined torque, said sun gear being coupled with said sprocket-mounting sleeve so as to rotate synchronously therewith, thereby rotating said sprocket-mounting sleeve at a speed larger than that of said spindle, and
        a first one-way clutch interconnecting said sun gear and said sprocket-mounting sleeve so that output of said sun gear can be transferred to said sprocket-mounting sleeve while preventing rotation of said sprocket-mounting sleeve from being transferred to said sun gear;

an auxiliary electrical transmission including:
- a rotational-angle limiting unit connected to said ring gear so as to limit said ring gear to rotate between a non-pushing position and a greatest-displacement position,
- a spring biasing said ring gear to said non-pushing position,
- a sensing unit including a magnet unit and an integrated circuit unit, said magnet unit including a pair of spaced-apart magnets between which said integrated circuit unit is located, said magnet unit being movable relative to said integrated circuit unit so as to produce in said integrated circuit unit a potential of a magnitude corresponding to relative displacement between said magnet unit and said integrated circuit unit, thereby generating a potential detecting signal when said potential reaches a predetermined potential upon rotation of said ring gear by a predetermined angle from said non-pushing position,
- a reduction gearing disposed in said casing and connected to said sprocket-mounting sleeve, and
- a second one-way clutch interconnecting said reduction gearing and said sprocket-mounting sleeve so that output of said reduction gearing can be transferred to said sprocket-mounting sleeve while preventing rotation of said sprocket-mounting sleeve from being transferred to said reduction gearing; and
- a motor unit accepting said signal from said integrated circuit unit to activate said reduction gearing when said potential reaches the predetermined potential, said motor unit having a motor shaft perpendicular to said spindle, and said reduction gearing includes:
  - a first bevel gear provided fixedly on said motor shaft;
  - a driving shaft journalled in said casing and parallel to said spindle;
  - a second bevel gear provided fixedly on said driving shaft and meshing with said first bevel gear;
  - a small spur gear provided fixedly on said driving shaft; and
  - a large spur gear sleeved rotatably on said sprocket-mounting sleeve and meshing with said small spur gear, said large spur gear having a tooth number larger than that of said small spur gear to rotate said large spur gear at a speed smaller than that of said motor shaft, said second one-way clutch interconnecting said large spur gear and said sprocket-mounting sleeve to transfer rotation of said large spur gear to said sprocket-mounting sleeve while preventing rotation of said sprocket-mounting sleeve from being transferred to said large spur gear;
- said rotational-angle limiting unit including said driving shaft and a positioning element which is fixed in said casing, said pushing element being biased by said spring to a position in which said pushing element abuts against said positioning element and in which said ring gear is located at said non-pushing position, said driving shaft extending through said generally circular hole in said ring gear and having a diameter smaller than that of said generally circular hole in said ring gear, thereby forming a clearance between said driving shaft and a wall of said ring gear which defines said generally circular hole,
- whereby, when the pedaling torque applied to said bicycle is above said predetermined torque, both said planetary gear train and said auxiliary electrical transmission transfer torque to said sprocket, thereby saving energy of a rider riding on said bicycle to run said bicycle.

2. A bicycle as claimed in claim 1, wherein said sensing unit includes a swing arm mounted pivotally in said casing, said pushing element of said ring gear being located between said positioning element and said swing arm, said magnets being fixed on said swing arm, said integrated circuit unit being fixed in said casing, said spring being a coiled compression spring which is positioned relative to said casing and which presses said swing arm against said pushing element of said ring gear, thereby pushing said pushing element against said positioning element, whereby, when the pedaling torque applied to said bicycle is above said predetermined torque, said pushing element pushes said swing arm and said magnets to rotate, thereby moving said magnets relative to said circuit unit.

* * * * *